Dec. 29, 1959
H. T. ROBINSON ET AL
2,919,021
SLIDE HOLDERS AND MAGAZINES THEREFOR
Filed Aug. 5, 1957
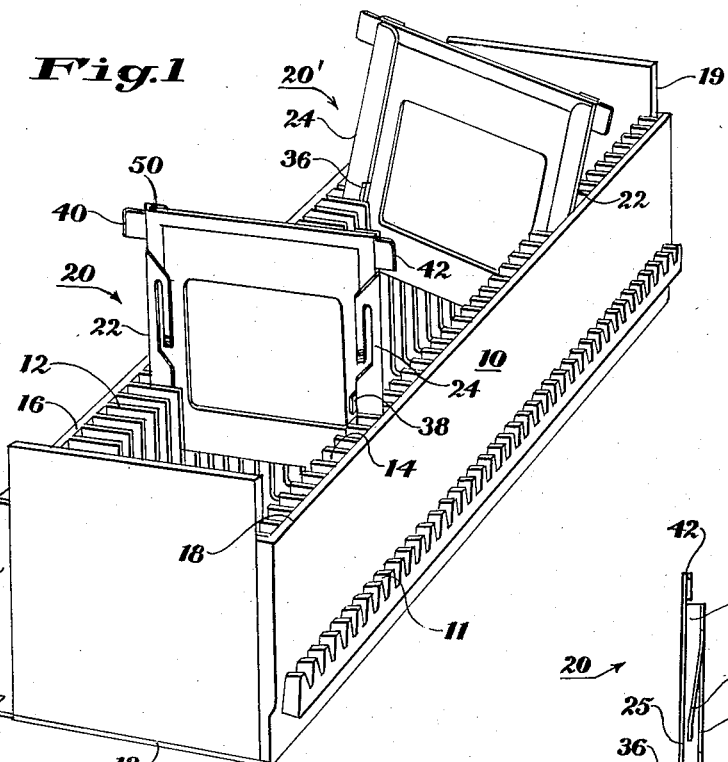
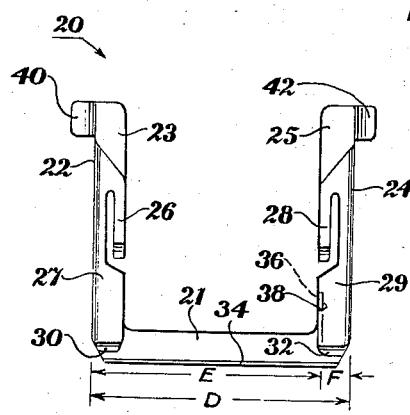
Fig.3
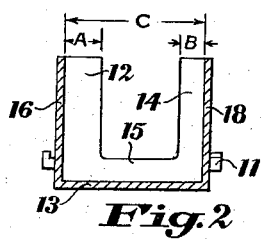
Fig.2
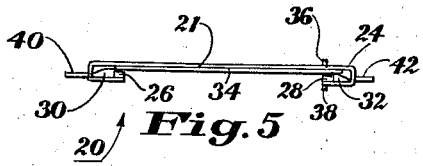
Fig.5
Herbert T. Robinson
Vernon H. Jungjohann
INVENTORS
BY R. Frank Smith
Robert W. Hampton
ATTORNEYS

United States Patent Office 2,919,021
Patented Dec. 29, 1959

2,919,021
SLIDE HOLDERS AND MAGAZINES THEREFOR

Herbert T. Robinson and Vernon H. Jungjohann, Rochester, N.Y., assignors to Eastman Kodak Company, Rochester, N.Y., a corporation of New Jersey Application August 5, 1957, Serial No. 676,290

4 Claims. (Cl. 206—62)

The present invention concerns holders for photographic slide transparencies and concerns a magazine adapted to store a plurality of such holders. More particularly, the invention concerns the structural interaction between the holders and the magazine by virtue of which the holders may be inserted into the magazine only in uniform orientation.

Modern slide projectors generally employ interchangeable magazines, each of which is adapted to store a plurality of photographic slide transparencies. The magazines may be classified as those in which the slides are stored directly and those in which each slide is stored in an intermediate holder which, in turn, is stored in the magazine. In a variety of circumstances the use of intermediate holders is preferred to the direct storage of slides in the magazine; these circumstances relate principally to the peculiarities of a particular projector mechanism.

If holders are used, as they are in the magazine of the present invention, they are supported in individual compartments of the magazine. A slide may be inserted into each holder in its compartment and the magazine may be inserted into the projector. Upon receiving the magazine, a typical projector then advances, or indexes, the magazine in steps corresponding to the compartment spacing to thereby align the successive slides with a projecting station, or gate. An elevator, or transfer member, at the projecting station moves the aligned holder and slide to a position on the optical axis of the projector where the actual projection occurs. The projected slide and its holder are returned to the magazine which is then indexed an additional step.

The details of the projector mechanism form no part of the present invention and will not be described herein. It is sufficient, with respect to the projector itself, to understand that proper projection of a slide requires rather exact positioning of the slide along the optical axis of the projector in order to achieve proper focussing. Otherwise stated, it is important for the elevator mechanism to place each successive slide in the same position along the optical axis, which position can then be treated, in the design of the projector lens system, as the proper slide position for good focus.

As a matter of design convenience, the slide holders of the present invention are asymmetrical in the direction of the optical axis of the projector, i.e., each has a front face and a back face. When a slide has been inserted into a holder its plane rests at different distances from the two faces of the holder. Therefore, if the holders were presented to the projector in random front-and-back orientation, the slides therein would not all be projected from the same position along the optical axis and some or all of them would be improperly focussed. To prevent such random orientation, it is desirable to insert all of the holders into the magazine with their respective faces oriented uniformly.

It is, therefore, a principal object of the present invention to affirmatively block all but a single front-and-back orientation of slide holders in a slide magazine. A more specific object of the invention is to form the slide holders and the compartment separators of the magazine with mating orienting elements which are offset from the longitudinal centerline of the magazine.

Other objects of the invention will appear from the following description, reference being made to the accompanying drawings, wherein:

Fig. 1 is a perspective view of the magazine showing one slide holder partially entered properly therein and another slide holder partially entered improperly therein;

Fig. 2 is a reduced-scale sectional end view of the magazine;

Fig. 3 is a front view of the slide holder;

Fig. 4 is a sectional left side view of the slide holder; and,

Fig. 5 is a top view of the slide holder.

Referring to Fig. 1, the magazine, indicated generally at 10, has a bottom wall 13 joined to a pair of side walls 16 and 18 and a pair of end walls 17 and 19 to form a rectangular box with an open top. The magazine is divided longitudinally into a series of compartments by a series of spaced partitions, shown best in Fig. 2. Each partition comprises a pair of vertical ribs 12 and 14 and a connecting base member 15. The ribs 12 and 14 of each partition are secured to the respective side walls 16 and 18 of the magazine, and the base member 15 of each partition is secured to the base wall 13 of the magazine. The side walls of the magazine are separated from each other by a distance C as shown in Fig. 2. Each rib 12 extends a distance A toward wall 18 and each rib 14 extends a distance B toward wall 16. It will be seen that ribs 12 and 14 and base member 15 of each partition form a U-shaped aperture which is offset from the longitudinal centerline of the magazine, i.e., $A>B$. It also will be seen that the presence of the aperture requires that $C>(A+B)$.

The base members 15 of the partitions are provided principally for structural rigidity of the magazine and may be dispensed with altogether, so that the partitions consist only of the two opposed and aligned series of ribs 12 and 14.

A rack 11, secured to the outer surface of the side wall 18 of the magazine, is employed for indexing the magazine in a projector. Rack 11 forms no part of the present invention and its operation will not be described in detail. It is sufficient to note that the tooth pitch of the rack corresponds to the spacing of successive partitions in the magazine.

Each compartment of the magazine is adapted to receive a slide holder 20, the detailed construction of which is best shown in Figs. 3, 4 and 5. Each holder comprises a U-shaped frame including a pair of side channels 22 and 24 and a base member 21. Side channels 22 and 24 have respective back guides 23 and 25 and respective front guides 27 and 29. The back guides are connected to and joined by base member 21. Front guides 27 and 29 are slotted to form respective spring members 26 and 28 which resiliently hold a slide transparency 50 (Fig. 1) that is entered between the tops of the front and back guides. The bottom of the base member 21 is bent forward at 34 (as best shown in Fig. 4) to form a stop for an inserted slide. The bottoms of front guides 27 and 29 are bent backward at 30 and 32, respectively (see also Fig. 3), to form camming surfaces which help guide a holder into a compartment of the magazine.

A pair of orienting members, such as ears 36 and 38, are formed on the front and back guides 25 and 29, respectively, of channel 24 and extend outwardly from the plane of the holder frame. The lateral position of ears 36 and 38 is such that the holder can be entered into a compartment of magazine 10 only if channel 24 of the holder is on the same side of the magazine as the shorter ribs 14.

If the holder is being inserted into the magazine with channel 24 on the same side of the magazine as ribs 14, as shown at 20 in Fig. 1, ears 36 and 38 are separated from side wall 18 of the magazine by a distance greater than B; therefore, ears 36 and 38 do not engage ribs 14 and the holder can be fully inserted into the magazine. However, if an attempt is made to insert a holder into the magazine with channel 24 on the same side of the magazine as ribs 12, as shown at 20' in Fig. 1, ears 36 and 38 are separated from side wall 16 of the magazine by a distance less than A and engage ribs 12; therefore, the holder cannot be fully inserted into the magazine.

Referring to Fig. 3 the outer edges of channels 22 and 24 are separated by a distance D. Ears 36 and 38 are separated from the outer edge of channel 22 by a distance E, and from the outer edge of channel 24 by a distance F. Since the holder is designed to be inserted into the magazine, $C>D$. Therefore, the maximum clearance between either side of the holder and the corresponding side wall of the magazine is $C-D$. Since ears 36 and 38 must be located at a distance from the outer edge of channel 24, which distance, together with the maximum clearance between the holder and the side wall of the magazine, must be less than the distance A but greater than the distance B, it is required that $A>(F+C-D)>B$. It will be seen that these requirements may be met even if ears 36 and 38 are located off center on the base member 21 of the holder frame, rather than on channel 24.

A pair of ears 40 and 42 extend laterally outward from the respective back guides 23 and 25 of each holder and are employed in conjunction with the projector elevating or transferring mechanism for moving the holder to the projecting position and then returning it to the magazine. Ears 40 and 42 also may be used to limit the movement of a holder into the magazine by engaging the tops of side walls 16 and 18 of the magazine.

We claim:

1. A slide holder having a pair of opposed channel members; a base member interconnecting said channel members; and at least one ear attached to only one of said channel members and extending perpendicularly to the plane of said channel and base members.

2. A slide holder having a U-shaped frame comprising a pair of side members interconnected by a base member, with an orienting member attached to said frame at a position which is closer to one side member than to the other, said orienting member extending perpendicularly to the plane of said frame.

3. An arrangement for assuring correct orientation of photographic slide holders, each having a pair of side edges, in a magazine having a pair of side walls, each of said holders being selectively insertable into and removable from said magazine, said arrangement comprising: a plurality of spaced pairs of aligned ribs connected to the side walls of the magazine with the first rib of each pair extending inwardly a first distance from one side wall and the second rib of each pair extending inwardly a shorter distance from the other side wall to form a series of compartments for receiving said holders; and an ear carried by at least one of said holders and spaced from a side edge of said holder by a distance less than said first distance and greater than said second distance, so that the cooperation of said ear with said ribs permits said holder to be inserted into a compartment in one and only one front-to-back orientation, due to engagement of said ear with said first rib if an attempt is made to insert the holder in the opposite orientation.

4. An arrangement for assuring correct orientation of planar photographic slide holders, each having a pair of side edges, in a magazine having a pair of side walls, with clearance between the magazine side walls and at least one side edge of each slide holder in the magazine, each slide holder being selectively insertable into and removable from said magazine, said arrangement comprising: a first series of spaced ribs extending from a first side wall of the magazine toward the second side wall; a second series of spaced ribs extending from said second side wall toward said first side wall, each rib of said first series being longer than and aligned with a corresponding rib of said second series to form a series of compartments for receiving said slide holders; and a respective projection carried by each slide holder and extending out of the plane of said holder at a predetermined distance from one of the side edges of said holder, said distance plus said clearance being less than the length of each rib of said first series and greater than the length of each rib of said second series.

References Cited in the file of this patent

UNITED STATES PATENTS

| | | |
|---|---|---|
| 1,273,894 | Madison | July 30, 1918 |
| 1,945,773 | Dennerlein | Feb. 6, 1934 |
| 2,603,017 | Merrill | July 15, 1952 |
| 2,630,219 | Pierce | Mar. 3, 1953 |
| 2,697,889 | Heim | Dec. 28, 1954 |
| 2,711,602 | Wiklund | June 28, 1955 |
| 2,781,125 | Mills | Feb. 12, 1957 |
| 2,839,857 | Teller | June 24, 1958 |